Jan. 23, 1951 D. ERNST 2,539,239
APPARATUS FOR TESTING GEAR DRIVES BY THE METHOD
OF UNILATERAL GEAR TOOTH ROLLING MOTION CONTROL
Filed May 11, 1945 4 Sheets-Sheet 1
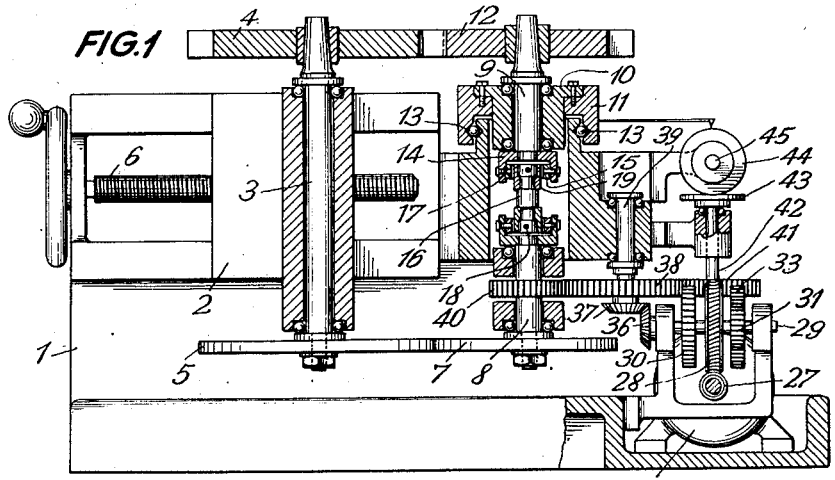
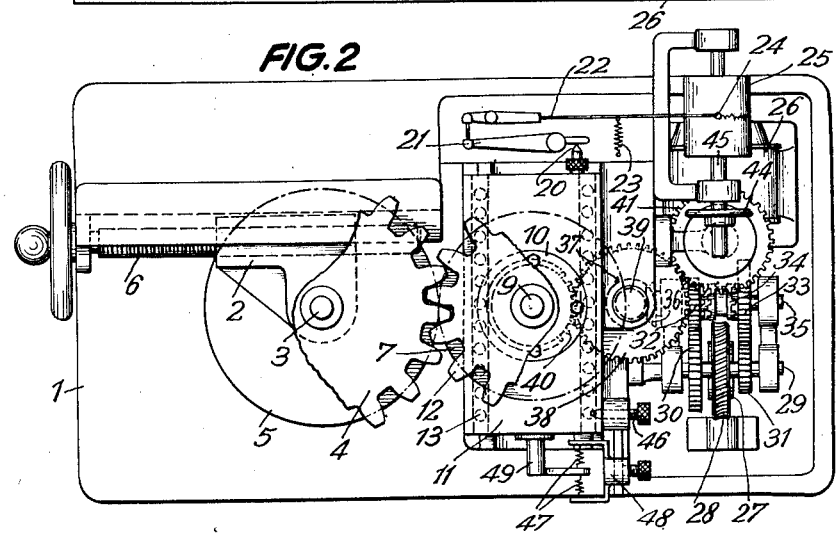
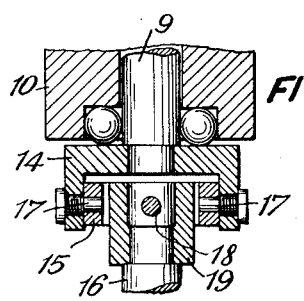
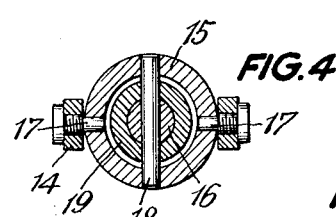
INVENTOR:
Daniel Ernst
by Sommers & Young
Attorneys Jan. 23, 1951         D. ERNST         2,539,239
APPARATUS FOR TESTING GEAR DRIVES BY THE METHOD
OF UNILATERAL GEAR TOOTH ROLLING MOTION CONTROL
Filed May 11, 1945                              4 Sheets-Sheet 2
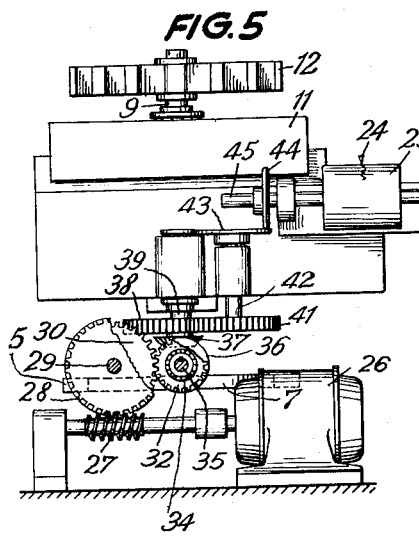
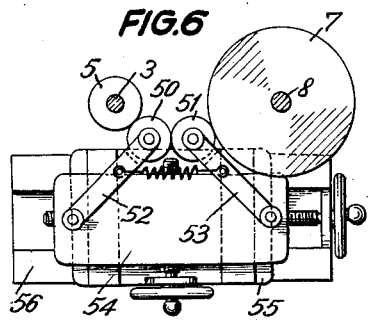
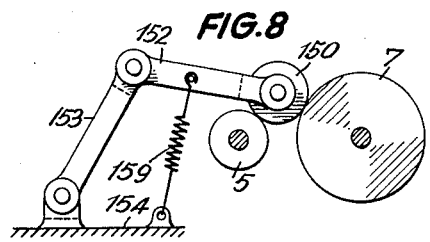
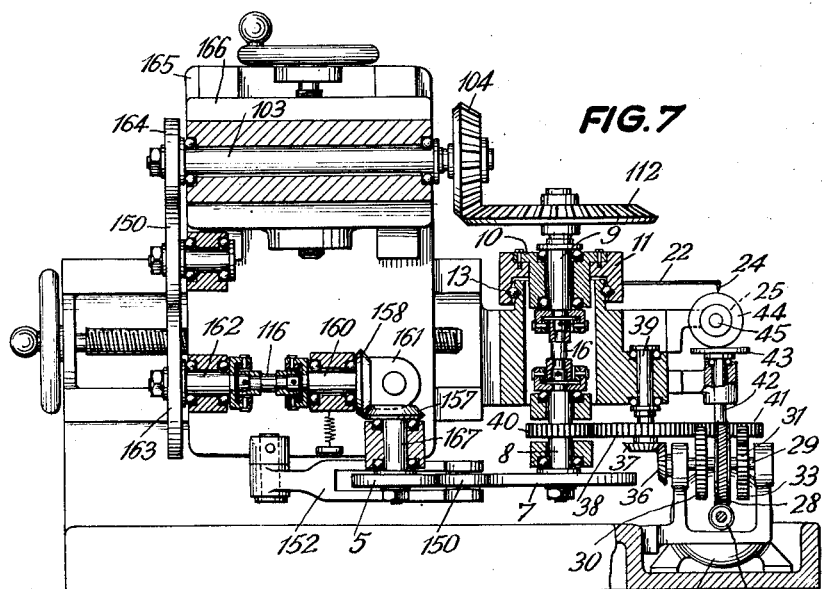
INVENTOR:
Daniel Ernst
by Sommers & Young
Attorneys Jan. 23, 1951 D. ERNST 2,539,239
APPARATUS FOR TESTING GEAR DRIVES BY THE METHOD
OF UNILATERAL GEAR TOOTH ROLLING MOTION CONTROL
Filed May 11, 1945 4 Sheets-Sheet 3

INVENTOR:
Daniel Ernst
by Sommers & Young
Attorneys

Jan. 23, 1951                D. ERNST               2,539,239
APPARATUS FOR TESTING GEAR DRIVES BY THE METHOD
OF UNILATERAL GEAR TOOTH ROLLING MOTION CONTROL
Filed May 11, 1945                                               4 Sheets-Sheet 4
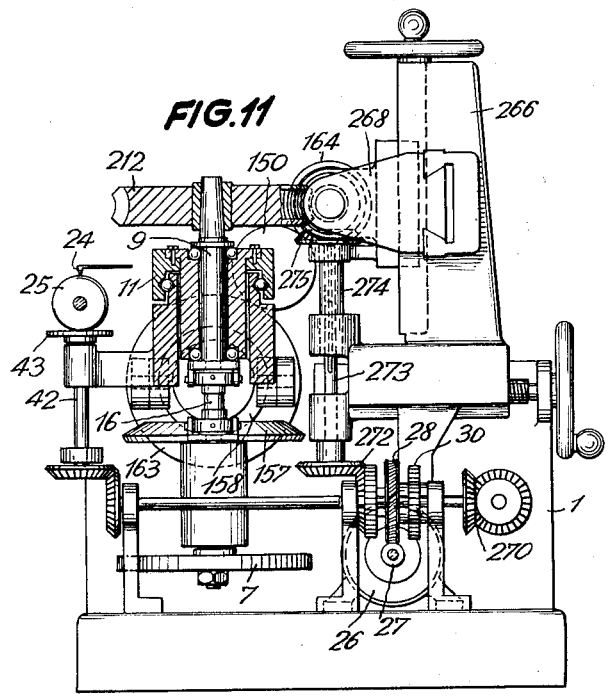
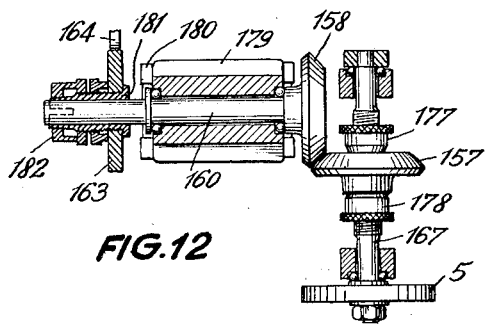
INVENTOR:
Daniel Ernst
by Sommers+Young
Attorneys Patented Jan. 23, 1951

2,539,239

UNITED STATES PATENT OFFICE 2,539,239

APPARATUS FOR TESTING GEAR DRIVES BY THE METHOD OF UNILATERAL GEAR TOOTH ROLLING MOTION CONTROL

Daniel Ernst, Zurich, Switzerland, assignor to Maag-Zahnräder und-Maschinen Aktiengesellschaft, Zurich, Switzerland Application May 11, 1945, Serial No. 593,210
In Germany April 19, 1944

9 Claims. (Cl. 73—162)

This invention relates to apparatus for testing gear by means of unilateral gear tooth rolling motion control with the aid of rolling cylinders which are connected with the axles of the test specimens and connected to each other and have the same ratio of gearing as the test specimens. Such an apparatus always indicates any faulty configuration of those tooth flanks which interengage with each other when rotating in a certain direction.

Apparatus of this kind are known which serve for the testing of spur gear drives. Compared with these the apparatus according to the present invention has the advantage of a wider range of applicability by being applicable to spur gear drives, bevel wheel drives and worm gear drives as well. The present apparatus differentiates from the known apparatus in that the axle of one of the test specimens is connected with the axle of an associated coaxial rolling cylinder, by means of a universal coupling which allows of one of said two axles to shift relative to the other axle and transmits the rotational movement unaltered.

Advantageously, the universal coupling is composed of two cross pivot universal joints.

Further, the displaceable axle is advantageously mounted on a slide and the shifting movements are visually exhibited by an indicating device in multiplied proportion.

Several embodiments of the invention are illustrated, by way of example only, in the accompanying drawings in which:

Fig. 1 is an elevation partly in section of an apparatus for testing spur gear drives;

Fig. 2 is a top plan view of Fig. 1;

Fig. 3 is a longitudinal section of the universal coupling;

Fig. 4 shows a cross section of this coupling;

Fig. 5 shows a side elevation of the apparatus illustrated in Figs. 1 and 2;

Fig. 6 shows an elevation of a modified coupling device for the rolling cylinders;

Fig. 7 shows an elevation partly in section of an apparatus for testing bevel wheel drives;

Fig. 8 is a view of the rolling cylinder shown in Fig. 7 and of the operative connection thereof;

Fig. 11 shows a side elevation of Fig. 9, and

Fig. 12 shows an elevation partly in section of an adjustable friction cone drive.

Figure 9:
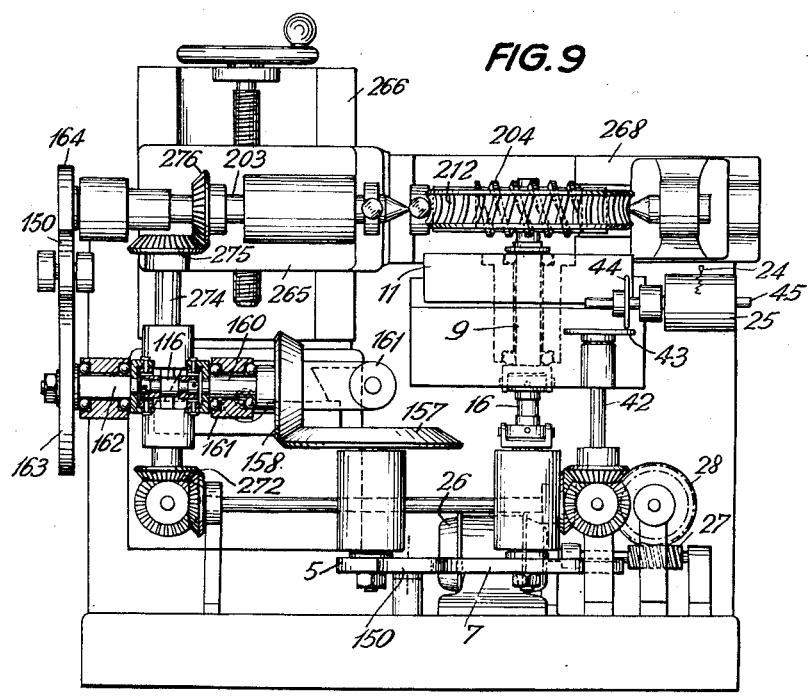
Fig. 9 shows an elevation of an apparatus for testing worm gear drives.

In the first exemplification as shown in Figs. 1 to 5 on the bed 1 of the apparatus a slide 2 is mounted which is adjustable in adaptation to the distance between the two test specimens. In the slide 2 an axle 3 is mounted so as to be rotatable with ease. To the upper end of this axle one of said spur gears to be tested, that is, the test specimen 4 (advantageously the larger one) is clamped so as to run exactly true to centre. The lower end of the axle 3 carries an exchangeable circular disc, that is, the rolling cylinder 5 of a diameter equalling that of the pitch circle of the test specimen. The rolling cylinder 5 is pressed by means of the feed screw 6 against a second rolling cylinder, the axle 8 of which is mounted in the bed 1 on ball bearings. The second test specimen 12 is fixed to an axle 9 which is mounted in a sleeve 10 which is screwed to a slide 11.

This slide is supported by means of ball races 13 so as to be movable in the direction at right angles to a plane, which passes through the axes of the two axles 3 and 8, with ease. The two axles 8, 9 are coaxially arranged and are coupled together by means of two cross pivot universal joints 14 to 19 (Figs. 2, 3 and 4). Each cross pivot universal joint is provided with a fork 14 which is fixed to the axle 8 or 9 respectively. A pivot ring 15 is provided with four diametrical bores. Two of said bores are engaged by pins 17 which are threadedly connected with the fork 14. With the other two bores engages a bolt 18 which extends through the hub 19 of an intermediary member 16. The twin cross pivot universal joint thus formed allows of the axle 9 to perform a slight axial displacement in parallelism with the axle 8 so that the rotational movement is transmitted perfectly unchanged. On the slide 11 (Fig. 2) a bolt 20 is secured which transmits movements of the slide that may arise to a lever 21 which transmits said movements to a scriber carrier lever 22 in multiplied proportion. A spring 23 acts to urge all the members into contacting engagement free from play. A scriber point 24 records the displacements of the slide 11, that is, the specimen 12 on a strip of paper which is supported by a drum 25.

As will be seen from Figs. 1, 2 and 5 a power drive is provided for the apparatus. An electric motor 26 rotates via a worm gear 27, 28 a counter shaft 29 which carries two gears 30 and 31. Operatively connected with these gears are two gears 32 and 33 respectively which by means of a change-over coupling 34 can be coupled to a shaft 35 selectively, at will. This shaft drives by means of a pair of bevel wheels 36, 37 a gear 38 the carrier shaft 39 of which is mounted in the bed 1. In mesh with said gear 38 are a gear 40, which is fastened to the axle 8 of the rolling cylinder 7, and a gear 41 the carrier shaft 42 of which is also mounted in the bed 1. The upper end of the shaft 42 carries a disc 43 which is frictionally engaged with a disc 44 extending perpendicularly thereto. The last named disc is mounted for displacement on the axle 45 of a record carrier drum for the purpose of varying the rotational movement of this drum, that is, the paper feed. During the time of clamping this test specimen 12 in position the movable slide 11 is retained in medial position by means of a set screw 46 (Fig. 2). During the measuring operation this screw is loosened and springs 47 then operate to urge by virtue of shifting movement of a holder 48 for the springs, via an arm 49, the slide 11 in the required direction.

The operation of the apparatus will be readily understood. The motor 26 slowly rotates by means of the gear 38 the axle 8 and the record carrier drum 25. The rolling cylinder 7 transmits this rotational movement of the axle 8 via the rolling cylinder 5 proportional to the ratio between the pitch circles to the test specimen 4 whilst the coaxial axles 8 and 9 and thus also the test specimen 12 have exactly the same velocity of rotation. The axles of the two test specimens are adjusted to the prescribed axial distance and under the pressure of the springs 47 on the easily movable slide 11 the flanks of the respective tooth surfaces enter intermittently into cooperation with each other. If these flanks are erroneously configurated the result will be that the slide 11 is displaced in a corresponding amount by the springs 47 (due to the fact that the rotational movement of both gears takes place at equal velocities of their pitch circles).

These slight slide movements are recorded by the scriber point 24 to the paper on the drum 25 in dependence upon the rotational movement of the test specimens in highly multiplied proportion. The respective left hand and right hand tooth flanks can be brought into operative engagement in either direction of rotation simply by changing over the spring holder 48. The rotational velocity is adapted by means of the gears 30, 32, that is, 31, 33 to the dimensions of the test specimens.

The arrangement may without any further provisions be such that the test specimens and the rolling cylinders mutually interchange their positions, that is to say, the two gears 4 and 12 (Fig. 1) are placed at the lower end of the axles 3 and 8 and the rolling cylinders 5 and 7 at the upper end of the axles 3 and 9. The operation and the measuring results obtained by this mode of proceeding with the apparatus are similar to those described above.

Alternatively the drive of the apparatus may be effected by hand instead of by driving power.

The rolling cylinders 5 and 7 may also be made smaller than the pitch circles of the two test specimens 4, 12, but must have the same ratio of gearing. In that event they may be either connected with each other by a thin steel band or by means of rollers 50 and 51 (Fig. 6) which are arranged on forked holders 52, 53 respectively which are carried by an auxiliary slide 54. This slide can be moved in the direction towards the rolling cylinders 5, 7 on a second slide 55 and can be moved by means of said slide 55 in the direction transversely thereto over a slide track 56 on the bed 1.

In Fig. 7 an apparatus for testing bevel wheels is shown which operates in a manner similar to that described for spur gears. As however the axes of the bevel wheels cross each other it is necessary to include between the test specimens a friction cone gearing of the same angle between its axes as that between the test specimens, for the transmission of the rotational movement. The test specimen axle 9 is connected with the coaxial rolling cylinder axle 8 by a cross pivot universal joint as described above. The rolling cylinder 7 rotates the rolling cylinder 5 via a roller 156 (Fig. 8) which is sustained by pivotal levers 152, 153 and is urged against the rolling cylinders by pressure action of a spring 159.

Connected with the rolling cylinder 5 is a conical roller 157 which drives a second roller 158. The axle 160 of the latter roller is, for the purpose of pressing the two rollers against each other, mounted in a fork 161 which can be pivotally displaced about the apex of the datum cone. The two coaxial axles 162 and 160 are interconnected by means of one of the above described cross pivot universal joints. Obviously the pair of conical rollers 157, 158 may be replaced by bevel wheels that are configurated perfectly true to form.

A further pair of rolling cylinders 163, 164 interconnected by an intermediary roller 150 transmits the rotational movement to an axle 103 and thus to the second test specimen 104, the diameter of the rolling cylinders being so chosen, that the speeds of revolution of the test specimens are inversely proportional to the numbers of teeth of the latter. The slides 165 and 166 are adjusted in accordance with the diameters of the bevel wheels. The drive is also in this case derived from a motor 26 and transmitted via the axle 8 to the gear 38. Alternatively, the rolling cylinder 7 may rotate the rolling cylinder 5 directly as disclosed in the first exemplification and the intermediary roller 150 associated with the rolling cylinders 163, 164 may in this instance be omitted.

Figure 10:
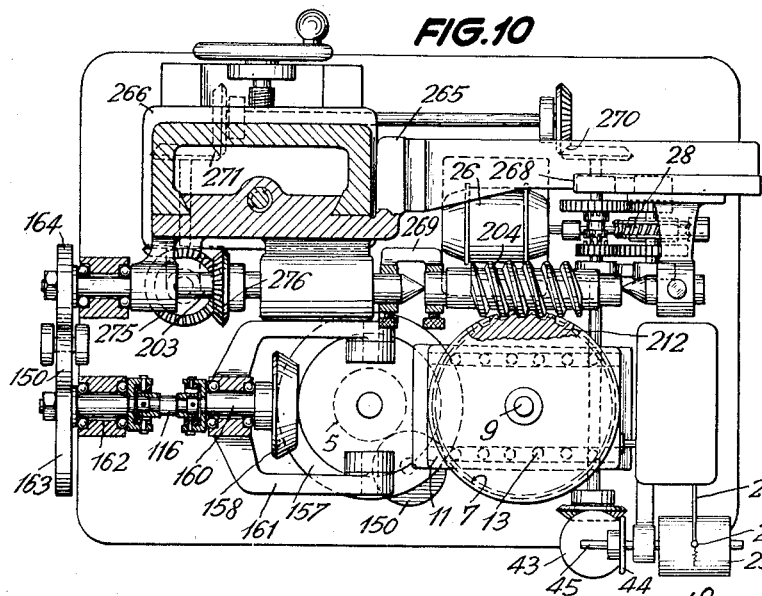
Fig. 10 is a top plan view of Fig. 9.

In order to permit of testing worm drives by the apparatus also, all there is necessary is to provide for the axle of the second test specimen, that is, the worm to be displaced in parallelism with itself for an amount corresponding to the radius of the worm wheel. Advantageously the drive is imparted to the axle of the worm in view of the ratio of gearing of the worm drives being usually great. As shown in Figs. 9, 10 and 11 the worm wheel 212 is mounted on the shaft 9 of the movable slide 11. The worm 204 is mounted between centering points in the usual manner and is guided by an arm 268 which is secured to the slide 265. A driving member 269 connects the worm shaft with the axle 203. For the fine adjustment of the worm relative to the diameter of the worm wheel and the center of this wheel slides 266 and 265 are provided.

The motor 26 rotates via the worm drives 27, 28 and the gears 30, 31 on one hand the record carrier drum 25 and on the other hand via the bevel wheel drive 270, 271 and 272 a fluted shaft 273. This shaft is in mesh with a hollow shaft 274 which drives the shaft 203 by means of bevel wheels 275 and 276. Thence the rotational movement is transmitted via the pair of rolling cylinders 164, 163 and the intermediary roller 150 to the axle 162 and via two cross pivot universal joints associated with the intermediary member 116 to the axle 160. The further course of movement transmission extends via the conical rollers 158, 157 to the first pair of rolling cylinders 5, 7 and eventually to the worm wheel 212 in the same manner as described for the apparatus shown in Fig. 7 for the testing of bevel wheels.

In Fig. 9 the fork 161 is visible which serves for pressing the conical roller 158 against the conical roller 157. The fork may be replaced by a fixed bearing. In this event the conical roller 158 would be required to be adjustable longitudinally of its carrier axle 160 and to be acted upon by spring pressure.

On the axle 9 of the movable slide 11 is mounted the worm wheel 212 which in performing relative rolling motion effects displacing movements parallel to the axle of the worm commensurate with erroneous configurations of its own tooth system and that of the worm. These movements are recorded on the paper strip on the drum 25 by the indication device. The rotational velocity of the worm wheel is decreased the less the more its diameter is increased; that is, the more the ratio of gearing of the worm drive amounts to.

Fig. 12 shows an adjustable friction cone drive for the apparatus for testing bevel wheels and worm drives. If the diameter of the various rolling cylinders do not precisely correspond to the ratio of gearing of the two test specimens the curve of errors recorded would extend on the skew to the straight line. The friction cone drive provided permits of correcting the ratio of gearing between all the measuring cylinders within certain limits. The friction cone roller 158 is mounted on a slide 179 which slides on the bed 180. The conical roller 157 is displaced relative to the axle 167 by means of two screws 177, 178 in accordance with the errors of the ratio of gearing in consequence whereof the conical roller 158 is urged against the other conical roller by means of the slide 179. In order to provide for the rolling cylinder 163 which shares in the movement of the axle 160 to correspond with the rolling cylinder 164 in regard to positioning the former is displaced relative to the axle 160 in the opposite direction to the adjustment of the conical rollers. This rolling cylinder is consequently arranged on a sleeve 181 which is correspondingly readjusted relative to the axle and is firmly clamped in position by a screw cap 182.

I claim:

1. In apparatus for testing gears by means of unilateral gear tooth rolling motion control, two rotatable supporting means for a pair of intermeshing gears to be tested, rolling cylinders operatively connected with each other and connected with supporting means for rotating same at a ratio of gearing corresponding to that of said gears being tested, rotation transmission means operatively connected with one said gear supporting means extending coaxially with oppositely disposed rotation transmission means on the corresponding rolling cylinder, a universal joint arranged between said oppositely disposed transmission means, a slide carrying said operatively connected supporting and transmission means, and allowing the last-named means to be displaced out of coaxiality with the other of said oppositely disposed transmission means commensurate with faulty gear tooth configuration, while the transmission of rotation between said two oppositely disposed transmission means is maintained unaltered, and an indicating device for accurately recording said displacing movements of said slide in multiplied proportion.

2. In apparatus for testing gears by means of unilateral gear tooth rolling motion control, two rotatable supporting means for a pair of intermeshing gears to be tested, each extending coaxially with the respective said gears, rolling cylinders operatively connected with each other and connected with supporting means for rotating same at a ratio of gearing corresponding to that of said gears being tested, rotation transmission means operatively connected with one said gear supporting means extending coaxially with oppositely disposed rotation transmission means on the corresponding rolling cylinder, a universal joint comprising two cross pivot joints arranged between said oppositely disposed transmission means in succession, a slide slidable perpendicularly to the plane through the axes of said gears carrying said operatively connected supporting and transmission means inclusive of part of said universal joint, resilient means cooperating with said slide for displacing same and said transmission means thereon for displacing the latter out of coaxiality with the other said oppositely disposed transmission means parallel to the axis of the latter commensurate with faulty gear tooth configuration, while the transmission of rotation between said two oppositely disposed transmission means is maintained unaltered, and an indicating device for accurately recording said displacing movements of said slide in multiplied proportion.

3. In apparatus for testing gears by means of unilateral gear tooth rolling motion control, two rotatable supporting means for a pair of intermeshing gears, inclusive of spur and bevel gears, each extending coaxially with the respective said gears, two rolling cylinders operatively connected with each other and connected with said supporting means for rotating same at a ratio of gearing corresponding to that of said gears being tested, rotation transmission means operatively connected with one said gear supporting means extending coaxially with oppositely disposed rotation transmission means on the corresponding rolling cylinder, a universal joint comprising two cross pivot joints arranged between said oppositely disposed transmission means in succession, a slide slidable perpendicularly to the plane through the axes of said gears carrying said operatively connected supporting and transmission means inclusive of part of said universal joint, with one of said pivots in each pivot joint extending in the direction of sliding of said slide and the other extending perpendicularly thereto, spring means cooperating with said slide for displacing same and said transmission means thereon for displacing the latter out of coaxiality with the other said oppositely disposed transmission means parallel to the axis of the latter commensurate with faulty gear tooth configuration, while the transmission of rotation between said two oppositely disposed transmission means is maintained unaltered, and an indicating device for accurately recording said displacing movements of said slide in multiplied proportion.

4. In apparatus for testing gears by means of unilateral gear tooth rolling motion control, two rotatable supporting means for two intermeshing gears, inclusive of worm gears, and worms to be tested, two trains of operatively connected rolling cylinders extending perpendicularly to each other and being operatively interconnected, and being connected with said supporting means for rotating same at a ratio of gearing corresponding to that of said gears being tested, a universal joint, a pair of coaxial oppositely disposed rotation transmission means interconnected by said universal joint, correlated to each said gear supporting means for continually maintaining accurate transmission of rotation between supporting means, a slide slidable parallel to the axis of said worm carrying said pair and its correlated supporting means and allowing the transmission means adjoining said supporting means and the other transmission means of said pair to be displaced out of coaxiality, commensurate with faulty gear tooth configuration, while the transmission of rotation between said two oppositely disposed transmission means is maintained unaltered, an indicating device for recording said displacing movements of said slide, and a multiplying leverage interposed between said indicating device and said slide, adapted for accurately recording said movements, in multiplied proportion.

5. In apparatus for testing gears by means of unilateral gear tooth rolling motion control, two rotatable supporting means for two intermeshing gears, inclusive of bevel and worm gears, and worms to be tested, two trains of operatively connected rolling cylinders extending perpendicularly to each other and being operatively interconnected, and being connected with said supporting means for rotating same at a ratio of gearing corresponding to that of said gears being tested, two universal joints, two pairs of coaxial oppositely disposed rotation transmission means interconnected by said universal joints respectively and correlated to each said gear supporting means, for continually maintaining accurate transmission of rotation between said supporting means, an axled driving cone operated drive, for transmission of rotation between said two trains of cylinders, intercalated between said two trains with its axles extending parallel with the respective said pairs and controlled by one said pair for continually maintaining accuracy of transmission of rotation by said drive, a slide carrying the other said pair and the correlated supporting means and allowing the transmission means adjoining the last-named means and the other transmission means of this pair to be displaced out of coaxiality commensurate with faulty gear tooth configuration, while the transmission of rotation between said two oppositely disposed transmission means is maintained unaltered, an indicating device for recording said displacing movements of said slide and a multiplying leverage interposed between said indicating device and said slide, adapted for accurately recording said movements in multiplied proportion.

6. In apparatus for testing gears by means of unilateral gear tooth rolling motion control, two rotatable supporting means for two intermeshing gears, inclusive of bevel and worm gears, and worms to be tested, two trains of operatively connected rolling cylinders extending perpendicularly to each other and being operatively interconnected, and being connected with said supporting means for rotating same at a ratio of gearing corresponding to that of said gears being tested, two universal joints, two pairs of coaxial oppositely disposed rotation transmission means interconnected by said universal joints respectively, and correlated to each said gear supporting means, for continually maintaining accurate transmission of rotation between said supporting means, an axled driving cone operated drive comprising two beveled rollers intercalated between said two trains with one of its axles extending coaxial with one of said units for the latter to control said drive for continually accurate transmission of rotation by accordingly forcing said rollers into mutual bearing engagement, a slide carrying the other said pair and the correlated supporting means and allowing the transmission means adjoining the last-named means and the other transmission means of this pair to be displaced out of coaxiality commensurate with faulty gear tooth configuration, while the transmission of rotation between said two oppositely disposed transmission means is maintained unaltered, an indicating device for recording said displacing movements of said slide, and a multiplying leverage interposed between said indicating device and said slide, adapted for accurately recording said movements in multiplied proportion.

7. In a motor-driven apparatus for testing gears by means of unilateral gear tooth rolling motion control, two rotatable supporting means for a pair of intermeshing gears to be tested, rotated by said motor, rolling cylinders operatively connected with each other and being connected with said supporting means for rotating same at a ratio of gearing corresponding to that of said gears being tested, rotation transmission means operatively connected with one said gear supporting means extending coaxially with oppositely disposed rotation transmission means on the corresponding rolling cylinder, a universal joint arranged between said oppositely disposed transmission means, a slide carrying said operatively connected supporting and transmission means, and allowing the last-named means to be displaced out of coaxiality with the other said oppositely disposed transmission means commensurate with faulty gear tooth configuration, while the transmission of rotation between said two oppositely disposed transmission means is maintained unaltered, an indicating device influenced by said motor, and a rotating recording drum carrying recording paper included in said device, permitting feeding of said paper on said drum conjointly with the relative rolling motion between said gears mounted on said supporting means.

8. In apparatus for testing gears by means of unilateral gear tooth rolling motion control two rotatable supporting means for a pair of intermeshing gears to be tested, two rolling cylinders of smaller diameter than the pitch circle of the correlated gears, two transmission rollers operatively connecting said cylinders with each other, said rollers being held in accurate peripheral driving contact with each other and with said cylinders, for rotating said cylinders in opposite directions of rotation, forked holders rotatably carrying said rollers, an auxiliary slide pivotally engaging said holders for adjusting and continually maintaining accuracy of said contact by accordingly setting said auxiliary slide, said cylinders being adapted in size and being connected with said supporting means for rotating same at a ratio corresponding to that of said gears being tested, rotation transmission means connected with said gear supporting means extending coaxially with oppositely disposed rotation transmission means on the corresponding rolling cylinder, a universal joint arranged between said oppositely disposed transmission means, a slide carrying said associated supporting and transmission means, and allowing the last-named means to be displaced out of coaxiality with the other said oppositely disposed transmission means commensurate with faulty gear configuration while the transmission of rotation between said two oppositely disposed transmission means is maintained unaltered, an indicating device for recording said displacing movements of said slide, and a multiplying leverage interposed between said indicating device and said slide, adapted for accurately recording said movements in multiplied proportion.

9. An apparatus for testing gears by means of unilateral gear tooth rolling motion control two rotatable supporting members for supporting a pair of intermeshing gears, inclusive of bevel and worm gears, and worms, to be tested, as claimed in claim 6, and means for mutually readjusting the two beveled rollers in the directions of their axes.

DANIEL ERNST.

REFERENCES CITED

The following references are of record in the file of this patent:

UNITED STATES PATENTS

| Number | Name | Date |
|---|---|---|
| 1,263,472 | Saurer | Apr. 23, 1918 |
| 1,374,698 | Wilkinson | Apr. 12, 1921 |
| 1,394,324 | Matthews | Oct. 18, 1921 |
| 1,479,338 | Thomas | Jan. 1, 1924 |
| 1,911,435 | Condon | May 30, 1933 |